(12) United States Patent
Woods

(10) Patent No.: US 6,666,352 B1
(45) Date of Patent: Dec. 23, 2003

(54) SAND FINISH SPRAY TEXTURE

(75) Inventor: John R. Woods, Woodland Hills, CA (US)

(73) Assignee: Spraytex, Inc., Valencia, CA (US)

( * ) Notice: Subject to any disclaimer, the term of this patent is extended or adjusted under 35 U.S.C. 154(b) by 541 days.

(21) Appl. No.: 09/654,976

(22) Filed: Sep. 5, 2000

(51) Int. Cl.[7] ................................................ G01F 11/00
(52) U.S. Cl. ........................ 222/1; 222/394; 222/402.1
(58) Field of Search ............................ 222/1, 635, 394, 222/402.1; 524/492

(56) References Cited

U.S. PATENT DOCUMENTS

| | | | | |
|---|---|---|---|---|
| 4,563,491 A | * | 1/1986 | Comune | 524/47 |
| 5,037,011 A | * | 8/1991 | Woods | 222/394 |
| 5,188,263 A | * | 2/1993 | Woods | 222/394 |
| 5,310,095 A | * | 5/1994 | Stern et al. | 222/402.1 |
| 5,409,148 A | * | 4/1995 | Stern et al. | 222/402.1 |
| 5,450,983 A | * | 9/1995 | Stern et al. | 222/1 |
| 5,489,048 A | * | 2/1996 | Stern et al. | 222/402.1 |
| 5,813,183 A | * | 9/1998 | Attley | 52/311.1 |
| 6,225,393 B1 | * | 5/2001 | Woods | 524/425 |
| 6,386,402 B1 | * | 5/2002 | Woods | 222/394 |
| 6,399,687 B2 | * | 6/2002 | Woods | 524/425 |

* cited by examiner

Primary Examiner—Joseph A. Kaufman
(74) Attorney, Agent, or Firm—Pillsbury Winthrop LLP

(57) ABSTRACT

A sand texture finish material in the form of a sprayable composition includes a polymer, sand, filler and a solvent which is either water or a volatile organic compound. The sand texture finish material is storable and dispensable from a pressurized dispenser having a delivery nozzle or other spray dispensing device. An aerosol system with a spray nozzle is included on the container for selective discharge of the textured material onto a prepared patch area or other substrate so as to match and blend with the surrounding sand texture finish in order to provide a continuous and unbroken coextensive surface texture of mechanically and visually matched material.

22 Claims, 1 Drawing Sheet

SAND FINISH SPRAY TEXTURE

BACKGROUND OF THE INVENTION

The present invention relates to surface texture materials, and more particularly to a novel pressurized substance in liquid or semi-liquid form that is storable and dispensable from an air-tight pressurized container to be sprayed onto a substrate that requires a sand texture finish so that after subsequent curing and hardening, a matching surface texture is provided with that of the material having a sand texture surrounding the area.

It has been conventional practice in the procedure of repairing or patching materials having a sand texture finish to remove the damaged portion and subsequently fill any holes, depressions, chips or the like with a prepared patch material. The patch or replacement material is applied by means of a trowel or other flat tool that will press the patch material into the hole or depression and that will prepare and provide a surface area to receive a finish surface coating. After the patch material has cured and adhered to the original support material, a smooth surface is provided that receives the final coating. This coating leaves a smooth surface that is not matched to the surrounding sand texture finished surface.

The present invention may also be applied to those materials having a sand texture finish where a portion of the texture has been chipped or flaked off. In that instance, the underlying surface may or may not have to be prepared in the above-described manner.

A sand texture finish usually presents a surface texture that has a roughened texture that is similar to sandpaper. The color of the texture coating may vary with that of the sand utilized in the spray. Such a texture and appearance cannot be attained through the use of smoothing tools or patch tools once a patch material has been applied to the damaged or repaired area. Therefore, difficulties and problems have been encountered that stem largely from the fact that the use and application of conventional patching materials on materials having a sand texture finish leaves a surface texture that does not match the surrounding area and is noticeable after the repair has been completed.

U.S. Pat. No. 4,563,491, to Commune, (the "'491" patent), discloses a stucco coating composition which is designed both for its protective qualities against environmental influences and for its aesthetic effect. Sand may be one ingredient of this coating. The stucco composition is designed to be applied by techniques including troweling, spraying or rolling. However, preparation of this composition entails the use of a rotatable mixing chamber and the composition, once prepared, dries in three to four hours. Given these factors, the composition is not suitable for quick, easy patching or being dispensed in the form of an aerosol spray.

U.S. Pat. No. 5,813,183, to Attley, (the "'183" patent) discloses a method of coating material with a protective coating having a rough, dull or granular surface appearance. One such coating includes sand (claim 9). The sand or equivalent particulate material is applied to an undercoating which has been heated to make it tacky or sticky. The particulate material then applied such that it sticks to the undercoating. This invention is not suited to patching or repairing an existing product having a sand texture finish. First, most people probably do not have the oven of the '183 patent or similar means to heat existing products to soften an undercoating. Secondly, the heat may damage that which the coating is applied to. Additionally, this is a relatively involved process for the simple patching of a damaged product.

Therefore, there is a need for a sprayable sand finish texture material that may be applied to a damaged area or to a repaired or patched area, and that may be contained in a hand-held applicator and dispensed using only one hand, so that the material may be conveniently stored as well as applied to the required area in a simple and convenient manner.

SUMMARY OF THE INVENTION

An object of the present invention is to provide a sand finish texture that is easily storable and readily available for easy dispensing.

Another object of the present invention is to provide a texture finish that will match and blend with existing sand texture finished materials.

Another object of the present invention is to provide a relatively quick and simple means for repairing damaged sand finished objects.

Another object of the present invention is to provide a sand finish texture that is easily applied.

Another object of the present invention is to provide a sand finish texture that may be applied by one who is not skilled in the art of repair.

Accordingly, the above problems and difficulties are obviated by the present invention, which provides a novel material that is storable and dispensable from a convenient dispenser including a pressurized container holding a quantity of the sand finish texture material in a liquid or semi-liquid condition so that upon depression of a dispensing nozzle, the material will be discharged and directed to a patch area or seam intended to receive the surface texture material.

In an embodiment of the present invention, the sand texture spray system may include: sand, fillers such as calcium carbonate or clay, a solvent such a water or a volatile organic compound (VOC), a polymer, antifreeze, a fungicide and a pressurized carrier for dispensing the material.

DESCRIPTION OF THE PREFERRED EMBODIMENT

Figure 2:
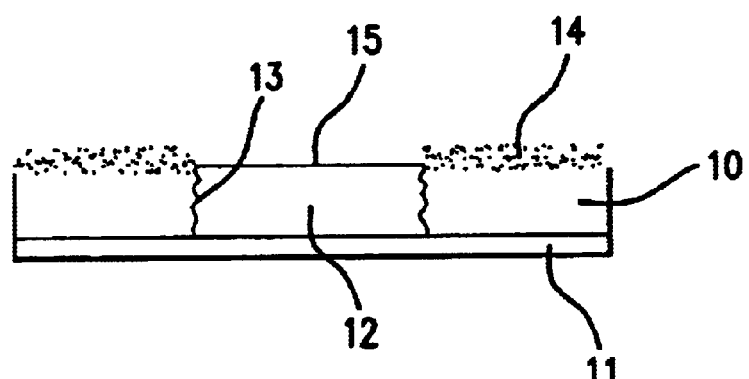
FIG. 2 illustrates a transverse cross-sectional view of the repaired or patched area shown in FIG. 1 showing the dissimilarity in surface texture between the original sand finish surface and the surface of the patched area.

Referring in detail to FIG. 2, a fragmentary view is shown of a typical piece of material including a sand finish texture and is identified by the number 10. The surface texture of the sand texture finish can be broadly defined as resembling sand in look and feel. The sand texture finish may be on a material which may be supported by boards or other means of support 11. The material on which there is a sand texture finish has been damaged and a repair to the damaged area has been performed in the form of a patch 12. An embodiment of the present invention may also be applied to areas where only the sand texture finish has been chipped or otherwise damaged.

After curing, the patch becomes solidified and adheres to the edge marginal region of support material 11 or the edge marginal region of damaged area 13.

In FIG. 2, it can be seen that the patch 12 displays a smooth surface 15 usually attained by repeatedly drawing the edge of a hand tool, such as a trowel, across the surface. After drying or curing, the material of the patch 12 becomes hard and the surface 15 remains smooth and unmatched with the surrounding sand texture finish 14 carried on the material 10. Although the surface 15 will accept a variety of coatings such as paint or the like in a conventional situation, the surface texture of the coating will not simulate or blend with the surrounding irregular surface of the sand texture finish 14. Visually, flat patch area 15 will always be noticeable and indicate the presence of a repair.

Figure 1:
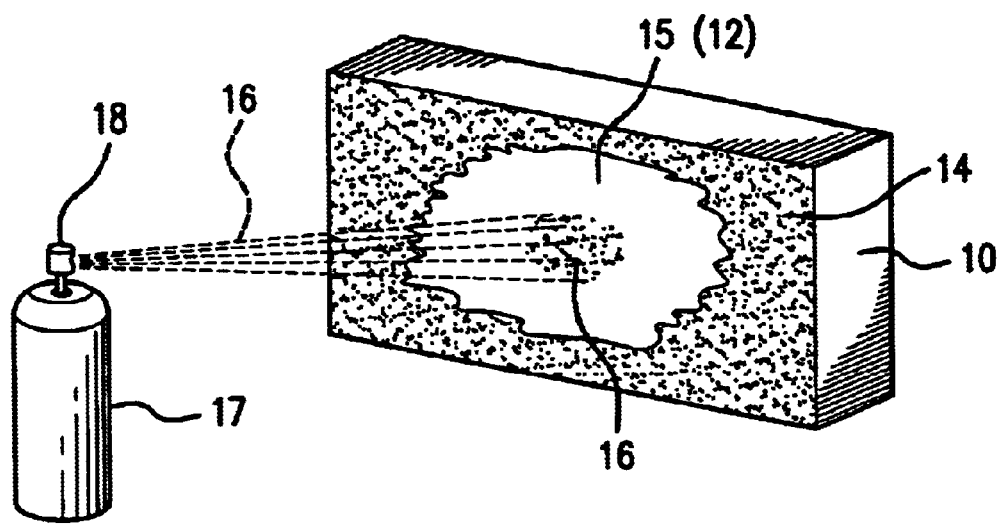
FIG. 1 illustrates the direct application of the spray-on surface texture material from the dispenser for repairing a sand finish surface in accordance with an embodiment of the present invention.
Figure 3:
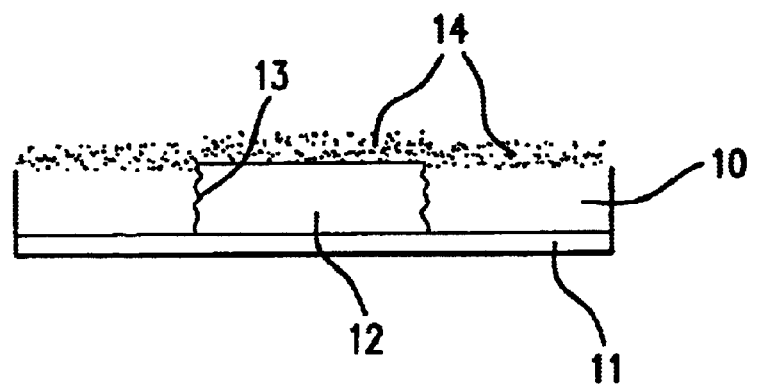
FIG. 3 illustrates a transverse cross-sectional view of the repaired or patched area on a sand texture finished material and shows matching of surface texture between the surface of the patch and the surrounding sand finish surface after use of the novel spray-on surface textured material of the present invention.

Referring now in detail to FIGS. 1 and 3, the surface textured material 16 discharged from a dispenser 17 is illustrated as being applied to the smooth surface 15 of patch 12. In this connection, a sand texture finish is placed on the flat surface 15 so as to be compatible with, blend with and be coextensive with the surrounding surface area 14. By employment of the present invention, the surface texture of both the patch 12 and the surrounding sand texture finish 14 are substantially identical and matched so that no visual indication is presented or noticeable pertaining to a repair or patch. The material being applied is broadly indicated by number 16 which is contained within the dispenser 17 and applied in the form of a spray in either liquid or semi-liquid condition. Application is achieved by depression of a pump or spray nozzle which permits discharge of the pressurized material carried within the container 17. Such an application of the material occurs directly on the desired area 19 by the user who hand-carries the container 17 and operates the nozzle 18 on the site with one hand.

While these figures depict the covering of a patched area, the present invention my also be used to cover areas having a sand finish that is cracked or chipped.

An appropriate nozzle for spraying the present invention is the Spraytex Aerosol Valve Assembly for Spraying Viscous Materials or Materials with Large Particulates (patent application pending). In the Spraytex Valve Assembly, the valve opening is located at the bottom of the container rather than the top. This allows highly viscous materials or materials having large particulates to be sprayed without clogging of the valves.

Of course, the Spraytex valve is offered by way of example, not limitation. Any valve that is appropriate for spraying the material of the present invention may be used.

Waste and loss of material is avoided since the discharge is under the control of the user through the application of the discharge nozzle 18. Therefore, there is no residue or excess material that is not used which requires disposal. Furthermore, the material 16 is gritty and, after curing on surface 15, provides an sand texture finish that is roughened and compatible with and matching the surrounding sand finish texture material. Additionally, the material in the container is considered a finished product and does not require additives of any kind. The labeling on the container may provide identification numbers and laboratory information.

Preferably, an example of the material 16 comprises filler, sand, a natural or synthetic polymer and a solvent. The filler may be any material that can serve as an extender or bodifier such as calcium carbonate, clay or similar substance, or mixtures thereof. The filler may also be made of a paint-based material. The solvent may be water or a volatile organic compound (VOC) such as a hydrocarbon, dimethyl ether, propane, butane, carbon dioxide, nitrogen, or any combination of the above said compounds or any other compounds used in the aerosol industry, such as hydrofluorocarbons. The material of the present invention may be under pressure to facilitate dispensing. The material of the present invention may also include antifreeze and/or a fungicide.

By way of an example, the hardenable flowable material 16 of the present invention may have the following composition by percentage weight:

| | |
|---|---|
| Filler | 20–60% |
| Sand | 5–40% |
| Natural or Synthetic Polymer | 3–10% |
| Solvent | 30-70% |

Also by way of a more specific example, the hardenable flowable material 16 of the present invention may have the following basic composition by percentage weight:

| | |
|---|---|
| Calcium Carbonate | 10–50% |
| Clay | 10–50% |
| Sand | 5–40% |
| Natural or Synthetic Polymer | 3–10% |
| Water or VOC | 30-70% |

The calcium carbonate and clay of the filler are preferably in powder form. Furthermore, the composition of material 15 may contain a fungicide (1–5%) and/or antifreeze (1–5%).

As illustrated in FIG. 1, the material 16 is applied directly to the smooth surface 15 and when dried or cured results in a sand texture finish which matches and is compatible with the material having a sand finish surrounding the patch. The patch material 12 is dried and cured in preparation for receiving the material 16. Even if small amounts of the material 16 extend beyond the surface 15 onto the surrounding material, the surface would still be matched and no unsightly patch edges or dissimilar surface texture would be detectable.

Many decorative coatings involving sand must be applied with a trowel or pressed in a mold. Clearly, it would not be practical to use a mold to coat a patch or repair a damaged area on an already finished product. It would be time-consuming and difficult to obtain the correct mold. Further, flat surfaces such as walls are not suited to being repaired by the use of molds. Further, using a trowel to apply textured patch material to a surface evenly requires a certain amount of skill, which many do not possess.

In contrast, the product of the present invention may be cleanly and simply applied through the use of a spray can. The present invention provides a means and a method of quickly and easily applying a thin, even application to one specific area. When the material of the present invention dries, there is no obvious unevenness or change in texture to indicate where the sand material was applied.

Additionally, an embodiment of the present invention is contained in a spray container. This facilitates clean-up, as the user does not have to clean a trowel or other spreading device. Further, any unused excess remains in the spray container, and may be disposed of with the container.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A hardenable flowable substance for application to a surface surrounded by material having a sand texture finish to form a layer of textured material on the surface, wherein the hardenable flowable substance is storable in a fluid-tight, pressurized dispensing container attached to a valve which is appropriate for large particles, the hardenable flowable substance comprising:

from about 20 to about 60 percent by weight filler;
from about 5 to about 40 percent by weight sand;
from about 3 to about 10 percent by weight binder; and
from about 30 to about 70 percent by weight solvent,
wherein the hardenable flowable substance is initially stored in fluid state and is dispensable in the form of an aerosol spray from the fluid-tight container and, after being released and cured, forms a sand texture finish that is compatible with the material having a sand finish surrounding the hardened substance.

2. The hardenable flowable substance according to claim 1, wherein the filler is selected from a group consisting of calcium carbonate, clay, and a mixture of calcium carbonate and clay.

3. The hardenable flowable substance according to claim 1, wherein the binder is selected from a group consisting of a natural polymer, synthetic polymer and a mixture of natural and synthetic polymer.

4. The hardenable flowable substance of claim 1, wherein the solvent is water based.

5. The hardenable flowable substance of claim 1, wherein the solvent is a volatile organic compound.

6. The hardenable flowable substance of claim 1, further comprising: fungicide.

7. The hardenable flowable substance of claim 6, wherein the fungicide has a composition by percentage weight of from about 0.05 to about 5 percent by weight.

8. The hardenable flowable substance of claim 1, further comprising: antifreeze.

9. The hardenable flowable substance of claim 8, wherein the antifreeze has a composition by percentage weight of from about 1 to about 5 percent by weight.

10. A system for dispensing a hardenable flowable substance for application to a surface surrounded by material having a sand texture finish to form a layer of textured material on the surface, the system comprising:

a fluid-tight, pressurized container, in which the hardenable flowable substance is stored;
an actuator on the fluid-tight container for selectively releasing the hardenable flowable substance in the form of an aerosol spray; and
a valve suitable for spraying the hardenable, flowable substance,
wherein said hardenable substance comprises:
from about 20 to about 60 percent by weight filler,
from about 5 to about 40 percent by weight sand,
from about 3 to about 10 percent by weight polymeric binder,
from about 0.05 to about 5 percent by weight fungicide, and
from about 30 to about 70 percent by weight solvent, and
wherein the hardenable flowable substance forms a sand texture finish that is compatible with the material having a sand finish surrounding the hardened substance.

11. The system for dispensing the hardenable flowable substance according to claim 10, wherein the filler is selected from a group consisting of calcium carbonate, clay, and a mixture of calcium carbonate and clay.

12. The system for dispensing the hardenable flowable substance according to claim 10, wherein the polymeric binder is selected from a group consisting of a natural polymer, a synthetic polymer, and a mixture of natural and synthetic polymer.

13. The hardenable flowable substance of the system of claim 10, wherein the solvent is water based.

14. The hardenable flowable substance of the system of claim 10, wherein the solvent is a volatile organic compound.

15. The system for dispensing the hardenable flowable substance according to claim 10, the hardenable flowable substance further comprising:

antifreeze.

16. The hardenable flowable substance of claim 15, wherein the antifreeze has a composition by percentage weight of from about 1 to about 5 percent by weight.

17. A method of repairing surfaces having a sand finish texture, the method comprising:

providing a hardenable flowable substance for application to a surface surrounded by material having a sand texture finish in a fluid-tight, pressurized dispensing container and appropriate valve, the hardenable flowable substance comprising:
from about 20 to about 60 percent by weight filler;
from about 5 to about 40 percent by weight sand;
from about 3 to about 10 percent by weight natural or synthetic polymer;
from about 0.05 to about 5 percent by weight fungicide, and
from about 30 to about 70 percent by weight solvent,
wherein the fluid-tight container has an actuator for dispensing the hardenable flowable substance in the form of an aerosol spray; and
wherein the fluid-tight container has a valve of appropriate size and function for dispensing the hardenable flowable substance, and
dispensing the hardenable flowable substance onto the surface such that the hardenable flowable substance forms a sand texture finish after being dispensed and cured which matches and is compatible with the material having a sand finish surrounding hardened substance.

18. The method of repairing materials having a sand finish texture according to claim 17, wherein the filler is selected from the group consisting of calcium carbonate, clay and a mixture of calcium carbonate and clay.

19. The method of repairing materials having a sand finish texture according to claim 17, wherein the solvent is water based.

20. The method of repairing materials having a sand finish texture according to claim 17, wherein the solvent is a volatile organic compound.

21. The method of repairing materials having a sand finish texture according to claim 17, the hardenable flowable substance further comprising:

antifreeze.

22. The method of repairing material materials having a sand finish texture according to claim 17, wherein the antifreeze has a composition by percentage weight of from about 1 to about 5 percent by weight.

* * * * *